United States Patent
Dunne et al.

(10) Patent No.: US 8,690,526 B2
(45) Date of Patent: Apr. 8, 2014

(54) HYDROELECTRIC TURBINE WITH PASSIVE BRAKING

(75) Inventors: Paul Dunne, Dublin (IE); James Ives, Dublin (IE)

(73) Assignee: OpenHydro IP Limited, Dublin (IE)

( * ) Notice: Subject to any disclaimer, the term of this patent is extended or adjusted under 35 U.S.C. 154(b) by 399 days.

(21) Appl. No.: 13/133,507

(22) PCT Filed: Dec. 14, 2009

(86) PCT No.: PCT/EP2009/008942
§ 371 (c)(1),
(2), (4) Date: Aug. 18, 2011

(87) PCT Pub. No.: WO2010/069538
PCT Pub. Date: Jun. 24, 2010

(65) Prior Publication Data
US 2011/0293399 A1   Dec. 1, 2011

(30) Foreign Application Priority Data

Dec. 18, 2008  (EP) ..................................... 08022013

(51) Int. Cl.
*F01D 15/12*   (2006.01)
*F01D 25/00*   (2006.01)

(52) U.S. Cl.
USPC ............. 415/123; 415/18; 416/32; 416/169 R

(58) Field of Classification Search
USPC ........ 415/3.1, 18, 91, 906; 384/624; 188/261, 188/73.1; 416/26, 32
See application file for complete search history.

(56) References Cited

U.S. PATENT DOCUMENTS

| | | |
|---|---|---|
| 228,467 A | 6/1880 | Maclay |
| 928,536 A | 7/1909 | Pino |
| 1,710,103 A | 4/1929 | Nelson |
| 2,054,142 A | 9/1936 | Sharp |
| 2,470,797 A | 5/1949 | Thomas |
| 2,501,696 A | 3/1950 | Souczek |
| 2,563,279 A | 8/1951 | Rushing |
| 2,658,453 A | 11/1953 | Walters |
| 2,782,321 A | 2/1957 | Fischer |
| 2,792,505 A | 5/1957 | Baudry |
| 2,874,547 A | 2/1959 | Fiore |

(Continued)

FOREIGN PATENT DOCUMENTS

| | | |
|---|---|---|
| CA | 2388513 | 8/2000 |
| CA | 2352673 | 1/2003 |

(Continued)

OTHER PUBLICATIONS

U.S. Appl. No. 13/133,235, filed Jun. 7, 2011, including the specification, claims and drawings.

(Continued)

*Primary Examiner* — Nathaniel Wiehe
*Assistant Examiner* — Michael Sehn
(74) *Attorney, Agent, or Firm* — Gardner, Linn, Burkhart & Flory, LLP

(57) ABSTRACT

This present invention relates to a hydroelectric turbine having a stator and a rotor within the stator on at least one set of bearings, the turbine having a brake which becomes operational following a predetermined level of bearing wear in order to avoid damage to the turbine.

14 Claims, 1 Drawing Sheet

(56) References Cited

U.S. PATENT DOCUMENTS

| | | |
|---|---|---|
| 3,078,680 A | 2/1963 | Wapsala |
| 3,209,156 A | 9/1965 | Struble, Jr. |
| 3,292,023 A | 12/1966 | Korber |
| 3,342,444 A | 9/1967 | Nelson |
| 3,355,998 A | 12/1967 | Roemisch |
| 3,384,787 A | 5/1968 | Schwartz |
| 3,422,275 A | 1/1969 | Braikevitch et al. |
| 3,477,236 A | 11/1969 | Burrus |
| 3,487,805 A | 1/1970 | Satterthwaite et al. |
| 3,708,251 A | 1/1973 | Pierro |
| 3,986,787 A | 10/1976 | Mouton, Jr. et al. |
| 3,987,638 A | 10/1976 | Burkhardt et al. |
| 4,095,918 A | 6/1978 | Mouton et al. |
| 4,163,904 A | 8/1979 | Skendrovic |
| 4,219,303 A | 8/1980 | Mouton, Jr. et al. |
| 4,274,009 A | 6/1981 | Parker, Sr. |
| 4,306,157 A * | 12/1981 | Wracsaricht .................. 290/54 |
| 4,367,413 A | 1/1983 | Nair |
| 4,421,990 A | 12/1983 | Heuss et al. |
| 4,427,897 A | 1/1984 | Migliori |
| 4,523,878 A | 6/1985 | Richart et al. |
| 4,541,367 A | 9/1985 | Lindberg |
| 4,613,762 A | 9/1986 | Soderholm |
| 4,720,640 A | 1/1988 | Anderson et al. |
| 4,740,711 A | 4/1988 | Sato et al. |
| 4,744,697 A | 5/1988 | Coppens |
| 4,744,698 A | 5/1988 | Dallimer et al. |
| 4,810,135 A | 3/1989 | Davenport et al. |
| 4,867,605 A | 9/1989 | Myers et al. |
| 4,868,408 A | 9/1989 | Hesh |
| 4,868,970 A | 9/1989 | Schultz et al. |
| 4,990,810 A | 2/1991 | Newhouse |
| 5,495,221 A | 2/1996 | Post |
| 5,592,816 A | 1/1997 | Williams |
| 5,606,791 A | 3/1997 | Fougere et al. |
| 5,609,441 A | 3/1997 | Khachaturian |
| 5,656,880 A | 8/1997 | Clark |
| 5,662,434 A | 9/1997 | Khachaturian |
| 5,715,590 A | 2/1998 | Fougere et al. |
| 5,800,093 A | 9/1998 | Khachaturian |
| 5,998,905 A | 12/1999 | Fougere et al. |
| 6,039,506 A | 3/2000 | Khachaturian |
| 6,109,863 A | 8/2000 | Milliken |
| 6,135,244 A * | 10/2000 | Le Bris .................. 188/73.37 |
| 6,166,472 A | 12/2000 | Pinkerton |
| 6,168,373 B1 | 1/2001 | Vauthier |
| 6,232,681 B1 | 5/2001 | Johnston et al. |
| 6,242,840 B1 | 6/2001 | Denk et al. |
| 6,300,689 B1 | 10/2001 | Smalser |
| 6,367,399 B1 | 4/2002 | Khachaturian |
| 6,406,251 B1 | 6/2002 | Vauthier |
| 6,409,466 B1 | 6/2002 | Lamont |
| 6,445,099 B1 | 9/2002 | Roseman |
| 6,476,709 B1 | 11/2002 | Wuidart et al. |
| 6,612,781 B1 | 9/2003 | Jackson |
| 6,648,589 B2 | 11/2003 | Williams |
| RE38,336 E | 12/2003 | Williams |
| 6,729,840 B2 | 5/2004 | Williams |
| 6,770,987 B1 | 8/2004 | Sogard et al. |
| 6,777,851 B2 | 8/2004 | Maslov |
| 6,806,586 B2 | 10/2004 | Wobben |
| 6,840,713 B1 | 1/2005 | Schia et al. |
| 6,843,191 B1 | 1/2005 | Makotinsky |
| 6,857,821 B2 | 2/2005 | Steenhuis et al. |
| 6,957,947 B2 | 10/2005 | Williams |
| 7,190,087 B2 * | 3/2007 | Williams .................. 290/53 |
| D543,495 S | 5/2007 | Williams |
| 7,275,891 B2 | 10/2007 | Owen et al. |
| 7,352,078 B2 | 4/2008 | Gehring |
| 7,378,750 B2 | 5/2008 | Williams |
| 7,425,772 B2 | 9/2008 | Novo Vidal |
| 7,471,009 B2 | 12/2008 | Davis et al. |
| 7,527,006 B2 | 5/2009 | Khachaturian |
| 7,611,307 B2 | 11/2009 | Owen et al. |
| 7,845,296 B1 | 12/2010 | Khachaturian |
| 7,874,788 B2 | 1/2011 | Stothers et al. |
| 2002/0034437 A1 | 3/2002 | Williams |
| 2003/0044272 A1 | 3/2003 | Addie et al. |
| 2003/0137149 A1 | 7/2003 | Northrup et al. |
| 2003/0155829 A1 | 8/2003 | McMullen et al. |
| 2003/0168864 A1 | 9/2003 | Heronemus et al. |
| 2003/0193198 A1 | 10/2003 | Wobben |
| 2003/0218338 A1 | 11/2003 | O'Sullivan et al. |
| 2004/0021386 A1 | 2/2004 | Swett |
| 2004/0021437 A1 | 2/2004 | Maslov et al. |
| 2004/0201299 A1 | 10/2004 | Naritomi et al. |
| 2004/0227500 A1 | 11/2004 | O'Meara |
| 2004/0232792 A1 | 11/2004 | Enfourth |
| 2004/0262926 A1 | 12/2004 | Hansen |
| 2005/0005592 A1 | 1/2005 | Fielder |
| 2005/0031442 A1 | 2/2005 | Williams |
| 2006/0261597 A1 | 11/2006 | Gehring |
| 2007/0018459 A1 | 1/2007 | Williams |
| 2007/0063448 A1 | 3/2007 | Kowalczyk |
| 2007/0164626 A1 | 7/2007 | Taniguchi et al. |
| 2007/0231072 A1 | 10/2007 | Jennings et al. |
| 2007/0241566 A1 | 10/2007 | Kuehnle |
| 2007/0262668 A1 | 11/2007 | Brisson et al. |
| 2007/0291426 A1 | 12/2007 | Kasunich et al. |
| 2008/0012538 A1 | 1/2008 | Stewart et al. |
| 2009/0278357 A1 | 11/2009 | Williams |
| 2010/0025998 A1 | 2/2010 | Williams |
| 2010/0026002 A1 | 2/2010 | Spooner |
| 2010/0068037 A1 | 3/2010 | Ives |
| 2010/0133838 A1 | 6/2010 | Borgen |
| 2010/0172698 A1 | 7/2010 | Ives et al. |
| 2010/0201129 A1 | 8/2010 | Holstein et al. |
| 2010/0232885 A1 | 9/2010 | Ives et al. |
| 2010/0295388 A1 | 11/2010 | Ives et al. |
| 2011/0018274 A1 | 1/2011 | Ives et al. |
| 2011/0088253 A1 | 4/2011 | Ives et al. |
| 2011/0110770 A1 | 5/2011 | Spooner et al. |
| 2012/0187680 A1 | 7/2012 | Spooner et al. |
| 2012/0235412 A1 | 9/2012 | Dunne et al. |

FOREIGN PATENT DOCUMENTS

| | | |
|---|---|---|
| CH | 260699 | 4/1947 |
| CH | 146935 | 8/1983 |
| DE | 3116740 | 11/1982 |
| DE | 3638129 | 5/1988 |
| DE | 3718954 | 12/1988 |
| DE | 19948198 | 4/2001 |
| DE | 10101405 | 7/2002 |
| DE | 20308901 | 9/2003 |
| DE | 10244038 | 4/2004 |
| DE | 102007016380 | 10/2008 |
| EP | 1318299 | 12/2003 |
| EP | 1564455 | 1/2005 |
| EP | 1691377 | 2/2006 |
| EP | 1876350 | 1/2008 |
| EP | 1878912 | 1/2008 |
| EP | 1878913 | 1/2008 |
| EP | 1879280 | 1/2008 |
| EP | 1878911 | 9/2008 |
| EP | 1992741 | 11/2008 |
| EP | 1885047 | 12/2008 |
| EP | 1980670 | 7/2009 |
| EP | 2088311 | 8/2009 |
| EP | 2110910 | 10/2009 |
| EP | 2112370 | 10/2009 |
| EP | 1980746 | 6/2010 |
| EP | 2199199 | 6/2010 |
| EP | 2199598 | 6/2010 |
| EP | 2199599 | 6/2010 |
| EP | 2199601 | 6/2010 |
| EP | 2199602 | 6/2010 |
| EP | 2199603 | 6/2010 |
| EP | 2200170 | 6/2010 |
| EP | 2071709 | 9/2010 |
| EP | 2209175 | 9/2010 |
| EP | 2241749 | 10/2010 |
| EP | 2302204 | 3/2011 |
| EP | 2302755 | 3/2011 |

(56) References Cited

FOREIGN PATENT DOCUMENTS

| | | |
|---|---|---|
| EP | 2302766 | 3/2011 |
| FR | 2823177 | 10/2002 |
| FR | 2859495 | 3/2005 |
| GB | 204505 | 10/1923 |
| GB | 924347 | 4/1963 |
| GB | 980575 | 1/1965 |
| GB | 1131352 | 10/1968 |
| GB | 1413835 | 11/1975 |
| GB | 2316461 | 2/1998 |
| GB | 2344843 | 6/2000 |
| GB | 2408294 | 5/2005 |
| GB | 2431628 | 5/2007 |
| GB | 2434413 | 7/2007 |
| GB | 2447514 | 9/2008 |
| JP | 59203881 | 11/1984 |
| JP | 63055370 | 3/1988 |
| JP | 01043908 | 2/1989 |
| JP | 2000341818 | 12/2000 |
| JP | 2005069025 | 3/2005 |
| JP | 2005248822 | 9/2005 |
| JP | 2006094645 | 4/2006 |
| JP | 2007255614 | 10/2007 |
| JP | 2007291882 | 11/2007 |
| WO | 9844372 | 10/1998 |
| WO | 9852819 | 11/1998 |
| WO | 9966623 | 12/1999 |
| WO | 0077393 | 12/2000 |
| WO | 0134973 | 5/2001 |
| WO | 0134977 | 5/2001 |
| WO | 02099950 | 12/2002 |
| WO | 03014561 | 2/2003 |
| WO | 03025385 | 3/2003 |
| WO | 03046375 | 6/2003 |
| WO | 2004015264 | 2/2004 |
| WO | 2004027257 | 4/2004 |
| WO | 2004107549 | 12/2004 |
| WO | 2004113717 | 12/2004 |
| WO | 2005045243 | 5/2005 |
| WO | 2005061887 | 7/2005 |
| WO | 2005078233 | 8/2005 |
| WO | 2005080789 | 9/2005 |
| WO | 2005116443 | 12/2005 |
| WO | 2006029496 | 3/2006 |
| WO | 2007043894 | 4/2007 |
| WO | 2007055585 | 5/2007 |
| WO | 2007083105 | 7/2007 |
| WO | 2007086814 | 8/2007 |
| WO | 2007125349 | 11/2007 |
| WO | 2008004877 | 1/2008 |
| WO | 2008006614 | 1/2008 |
| WO | 2008050149 | 5/2008 |
| WO | 2008081187 | 7/2008 |
| WO | WO2010118766 | 10/2010 |
| WO | WO2011039249 | 4/2011 |
| WO | WO2011039255 | 4/2011 |
| WO | WO2011039267 | 4/2011 |

OTHER PUBLICATIONS

U.S. Appl. No. 13/133,805, filed Jun. 9, 2011, including the specification, claims and drawings.
U.S. Appl. No. 13/133,504, filed Jun. 8, 2011, including the specification, claims and drawings.
U.S. Appl. No. 13/133,832, filed Jun. 9, 2011, including the specification, claims and drawings.
U.S. Appl. No. 13/264,667, filed Oct. 14, 2011, including specification, claims and drawings.
International Search Report completed Apr. 19, 2010, mailed Apr. 27, 2010, from corresponding Application No. PCT/EP2009/008942.
PCT Written Opinion of International Searching Authority, Apr. 19, 2010, from corresponding Application No. PCT/EP2009/008942.

* cited by examiner

HYDROELECTRIC TURBINE WITH PASSIVE BRAKING

FIELD OF THE INVENTION

This invention relates to a hydroelectric turbine, in particular when employed at tidal sites, the turbine including a brake, preferably a passive brake which becomes operational following a predetermined level of bearing wear, in order to avoid damage to the turbine.

BACKGROUND OF THE INVENTION

The environmental impact of the industrialisation of the planet, in particular the use of fossil fuels to supply our energy needs, is at the stage when it can no longer be ignored, and as a result significant resources are now being directed into alternative forms of energy generation. The most promising of these new forms of alternative energies are solar power, wind power, thermal power and tidal power. Tidal power appears to provide the most consistent and predictable form of power, although harnessing tidal power is arguably the most difficult of the above power sources, given the harsh submarine conditions in which hydroelectric turbines must be located in order to generate electricity.

Hydroelectric turbines are generally located on the seabed in areas of high tidal flow which give rise to extremely difficult working conditions. Access to the turbines once located on the seabed is difficult, time consuming and dangerous, and is preferably kept to a minimum. In addition, it is extremely difficult to monitor the condition of the various working parts of the turbines, for example monitoring for excessive bearing wear which may result in damage to the turbine, requiring costly repairs and down time in the electrical generating capacity of that turbine.

It is therefore an object of the present invention to provide a hydroelectric turbine and a method of operating same, which will avoid damage to the turbine in the event of excessive bearing wear.

SUMMARY OF THE INVENTION

According to a first aspect of the present invention there is provided a hydroelectric turbine comprising a stator and a rotor; at least one set of bearings supporting the rotor within the stator; and a brake which is operable to apply a braking force to the rotor upon a predetermined level of wear of the at least one set of bearings, wherein the brake comprises one or more sections of brake pad having a braking surface positioned radially inboard of a bearing surface of the at least one set of bearings with respect to the direction of wear of the bearing.

Preferably, the brake is a passive brake.

Preferably, the or each section of brake pad is formed integrally with the at least one set of bearings.

Preferably, the at least one set of bearings comprises journals and bearing blocks.

Preferably, the journals are mounted to the rotor and the bearing blocks are mounted to the stator.

Preferably, each section of brake pad is located within one of the bearing blocks.

Preferably, a braking surface of the one or more sections of brake pad is recessed from a bearing surface of the bearing block.

Preferably, each section of brake pad is flanked on both sides by a section of bearing block.

Preferably, the brake is operable to apply the braking force to the rotor regardless of the circumferential position on the turbine at which the predetermined level of wear of the at least one set of bearings occurs.

Preferably, sections of brake pad are disposed around substantially the entire circumference of the turbine.

Preferably, the at least one set of bearings comprising at least one radial bearing and at least one thrust bearing, the brake being operable to apply the braking force to the rotor upon a predetermined level of wear of either the radial bearing or the thrust bearing.

According to a second aspect of the present invention there is provided a method of preventing damage to a hydroelectric turbine, the turbine comprising a stator, a rotor, at least one set of bearings therebetween, and a brake comprising one or more sections of brake pad having a braking surface positioned radially inboard of a bearing surface of the at least one set of bearings with respect to the direction of wear of the bearing, the method comprising the step of: automatically applying a braking force to the rotor in response to a predetermined level of wear of the at least one set of bearings through contact of the braking surface with the stator or rotor following wearing of the bearing surface to the level of the braking surface.

Preferably, the method comprises applying sufficient braking force to the rotor to substantially arrest rotation of the rotor.

Preferably, the method comprises applying the braking force to the rotor regardless of the position on the turbine at which the predetermined level of bearing wear occurs.

DETAILED DESCRIPTION OF THE DRAWINGS

Figure 1:
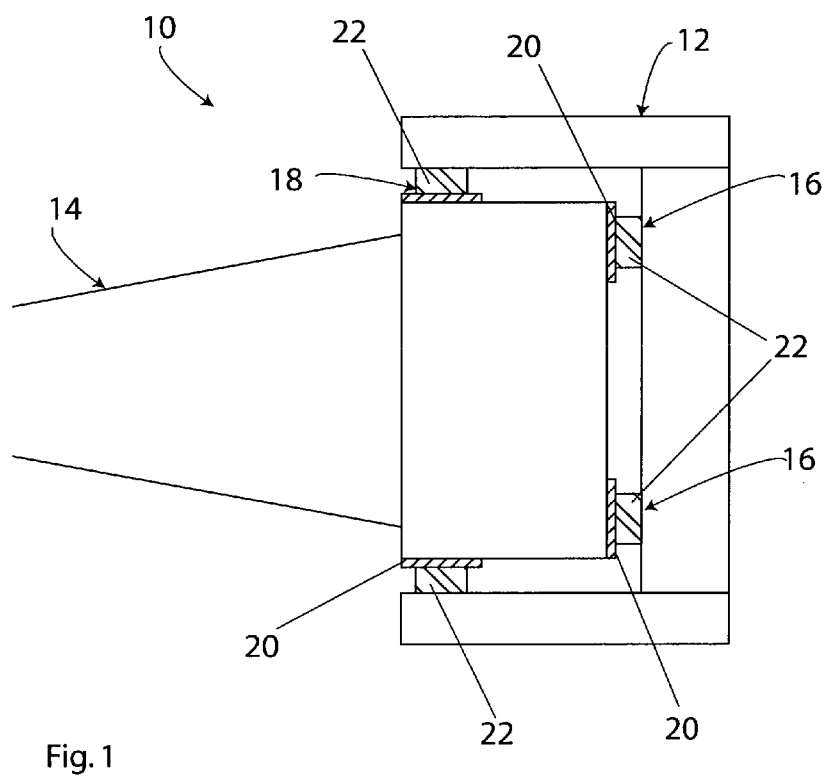
FIG. 1 illustrates schematic sectioned view of hydroelectric turbine according to a preferred embodiment of the present invention.

Referring now to the accompanying drawings there is illustrated a hydroelectric turbine, generally indicated as (10) which is intended to be located on the seabed or the like in order to generate electricity in response to the tidal or other flow of water through the turbine (10). The turbine (10) comprises a ring shaped stator which in use is fixed to a suitable base (not shown) or the like, and within which is mounted for rotation a rotor (14). The stator (12) is provided with an annular array of coils (not shown) while the rotor is provided with a corresponding annular array of magnets mounted around the exterior circumference thereof. Rotation of the rotor (14) within the stator (12) results in relative movement between the coils and magnets, generating an EMF in order to provide the electrical power output from the turbine (10). In the preferred embodiment illustrated the turbine (10) comprises an open centre turbine, although it will be appreciated from the following description that the invention could be applied to other forms of hydroelectric turbine.

The turbine (10) further comprises bearings in the form of a pair of radial bearings (16) and a pair of thrust bearings (18). The radial bearings (16) bear the weight of the rotor (14) and prevent unwanted radial movement of the rotor (14) within the stator (12). The thrust bearings (18) bear the axial load applied to the rotor (14) by the tidal flow of water against the rotor (14). Thus this load will reverse as the tide reverses. In the preferred embodiment illustrated both the radial and thrust bearings (16, 18) each comprise an annular journal (20) circumscribing the rotor (14) and secured thereto by any suitable means. The journal (20) may be formed from any suitable material, for example stainless steel. The bearings (16, 18) further comprise an annular array of bearing blocks (22) which run on the corresponding journals (20). The bearing blocks are mounted to the stator (12) by any suitable means. The bearing blocks (22) may be formed from any suitable material, for example a material having a sufficiently low co-efficient of friction but which is hard enough to provide an acceptable rate of wear. It will be appreciated that the position and number of the bearings (16, 18) may be altered as required.

Figure 2:
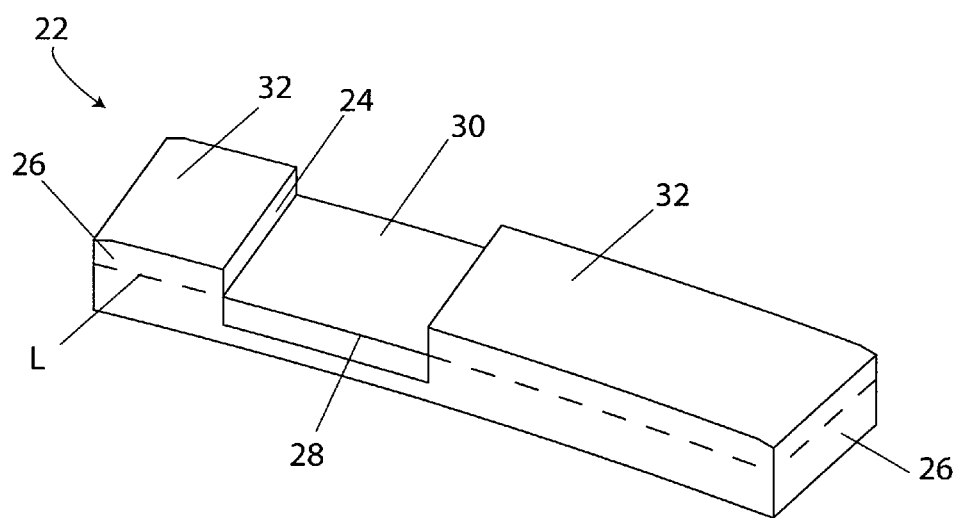
FIG. 2 illustrates a perspective view of a bearing block forming part of the hydroelectric turbine illustrated in FIG. 1.

Referring in particular to FIG. 2 there is illustrated one of the bearing blocks (22) in isolation from the turbine (10). The bearing block (22) is substantially U-shaped having a recessed central portion (24) flanked by a pair of shoulder sections (26) which stand proud of the central section (24). Mounted within the central section (24) is a brake pad (28). A braking surface (30) of the brake pad (28) is positioned radially inwardly of a bearing surface (32) of the bearing block (22), with respect to the direction in which the bearing block (22) will wear during use. As described in detail above, the radial and thrust bearings (16, 18) each comprise a circular array of the bearing blocks (22) in end to end alignment with one another. It should however be appreciated that not every bearing block (22) need be provided with the brake pad (28) therein. For example every second bearing block (22) in the radial and thrust bearing (16, 18) may be provided with the brake pad (28) therein. For bearing blocks (not shown) without the brake pad (28) it is preferred that the central section (24) is not provided and so those bearing blocks will have a continuous bearing surface. Further alternatively brake pads (28) may only be provided in a number of the bearing blocks (22) around the circumference of the turbine (10).

During use the rotor (14) spins within the stator (12), and the journals (20) of the radial and thrust bearing (16, 18) run on the corresponding bearing blocks (22), slowly causing wear to the bearing blocks (22) as they are formed from a softer material than the journals (20). As the bearing blocks (22) wear the bearing surface (32) will slowly recede towards the braking surface (30) of the brake pad (28). Thus it will be appreciated that eventually the bearing blocks (22) will wear so much that the brake pad (28) will be exposed from within the central section (24), thus contacting the respective journal (20). A wear line (L) indicates the level of wear of the bearing block (22) which will result in exposure of the respective brake pad (28). As the brake pad (28) comprises a material having a significantly higher co-efficient of friction then the bearing blocks (22), contact between the brake pad (28) and the respective journal (20) will result in slowing and eventually a full stop of the rotor (14). This will ensure that the radial and thrust bearing (16, 18) do not wear to a level which could result in damage to the turbine (10), for example if the rotor (14) were to foul the stator (12), which could result in damage to the coil/magnets of the turbine (10).

It will be appreciated that brake pads (28) need not be provided in both the radial and thrust bearings (16, 18), although it is preferred. Similarly it will be understood that brake pads (28) do not need to be provided in both radial bearings (16), or both thrust bearings (18), although again it is preferred. Similarly it is to be understood that the positions of the journals (20) and bearing blocks (22) could be reversed, such that the bearing blocks (22) are positioned on the rotor (14) and the journals (20) are positioned on the stator (12). Alternatively the journals (20), particularly if formed from a material with a higher wear rate than the bearing blocks (22), could be provided with the brake pads (28) recessed therein. It is also possible that both the journals (20) and the bearing blocks (22) would be provided with brake pads (28) therein.

As mentioned above it is not necessary that brake pads (28) are positioned around the entire circumference of the radial and thrust bearings (16, 18). However it is preferred that brake pads (28) are provided around substantially the entire circumference of said bearings (16, 18). As bearing wear occurs, in particular at one point around the circumference of the stator (12), it will then be possible for the rotor (14) to move closer to the stator (12) at that point of increased wear. This will mean that the magnets and coils of the turbine (10) will be brought into closer proximity with one another, and could eventually contact one another resulting in damage thereto. By providing the brake pads (28) around substantially the entire circumference of the rotor (14) and stator (12), the possibility is avoided of the rotor (14) and stator (12) getting too close to one another at any position around the circumference of the turbine (10). The positioning of the brake pads (28), in particular the position of the braking surface (30), is chosen such that rotation of the rotor (14) will be arrested prior to the point being reached at which the proximity of the rotor (14) to the stator (12) could result in damage to the turbine (10).

The provision of the brake pads (28) thus avoids the possibility of damage to the turbine (10) during operation, and will as a result reduce the maintenance requirements on the turbine (10).

The invention claimed is:

1. A hydroelectric turbine comprising a stator and a rotor; at least one set of bearings supporting the rotor within the stator; and a brake which is operable to apply a braking force to the rotor upon a predetermined level of wear of the at least one set of bearings, wherein the brake comprises one or more sections of brake pad having a braking surface positioned radially inboard of a bearing surface of the at least one set of bearings with respect to the direction of wear of the bearing.

2. A hydroelectric turbine according to claim 1 in which the brake is a passive brake.

3. A hydroelectric turbine according to claim 1 in which the or each section of brake pad is formed integrally with the at least one set of bearings.

4. A hydroelectric turbine according to claim 1 in which the at least one set of bearings comprises journals and bearing blocks.

5. A hydroelectric turbine according to claim 4 in which the journals are mounted to the rotor and the bearing blocks are mounted to the stator.

6. A hydroelectric turbine according to claim 3 in which each section of brake pad is located within one of the bearing blocks.

7. A hydroelectric turbine according to claim 4 in which a braking surface of the one or more sections of brake pad is recessed from a bearing surface of the bearing block.

8. A hydroelectric turbine according to claim 6 in which each section of brake pad is flanked on both sides by a section of bearing block.

9. A hydroelectric turbine according to claim 1 in which the brake is operable to apply the braking force to the rotor regardless of the circumferential position on the turbine at which the predetermined level of wear of the at least one set of bearings occurs.

10. A hydroelectric turbine according to claim 1 in which sections of brake pad are disposed around substantially the entire circumference of the turbine.

11. A hydroelectric turbine according to claim 1 in which the at least one set of bearings comprising at least one radial bearing and at least one thrust bearing, the brake being operable to apply the braking force to the rotor upon a predetermined level of wear of either the radial bearing or the thrust bearing.

12. A method of preventing damage to a hydroelectric turbine, the turbine comprising a stator and a rotor and at least one set of bearings therebetween, and a brake comprising one or more sections of brake pad having a braking surface positioned radially inboard of a bearing surface of the at least one set of bearings with respect to the direction of wear of the bearing, the method comprising the step of:

automatically applying a braking force to the rotor in response to a predetermined level of wear of the at least one set of bearings through contact of the braking surface with the stator or rotor following wearing of the bearing surface to the level of the braking surface.

13. A method according to claim 12 comprising applying sufficient braking force to the rotor to substantially arrest rotation of the rotor.

14. A method according to claim 12 comprising applying the braking force to the rotor regardless of the position on the turbine at which the predetermined level of bearing wear occurs.

* * * * *